United States Patent [19]

Farr et al.

[11] 4,344,200
[45] Aug. 17, 1982

[54] BRIDGE BRAKE SYSTEM

[75] Inventors: Aaron V. Farr, Logan; Robert L. Saunders, Ogden, both of Utah

[73] Assignee: Abex Corporation, New York, N.Y.

[21] Appl. No.: 190,685

[22] Filed: Sep. 25, 1980

[51] Int. Cl.³ .............................................. E01D 1/00
[52] U.S. Cl. ............................................................. 14/71.5
[58] Field of Search ................... 14/71.5, 71.3; 187/89, 187/73; 318/671

[56] References Cited

U.S. PATENT DOCUMENTS

| | | | |
|---|---|---|---|
| 2,688,761 | 9/1954 | Good | 14/71.5 |
| 3,184,772 | 5/1965 | Moore | 14/71.5 |
| 3,358,308 | 12/1967 | Henchbarger | 14/71.5 |
| 3,369,264 | 2/1968 | Kurka | 14/71.5 |
| 3,599,262 | 8/1971 | Carder | 14/71.5 |
| 3,913,757 | 10/1975 | Lovey | 14/71.5 X |
| 4,012,804 | 3/1977 | Catlett | 14/71.3 |

Primary Examiner—Nile C. Byers, Jr.
Attorney, Agent, or Firm—Thomas S. Baker, Jr.; David A. Greenlee

[57] ABSTRACT

A brake system for an aircraft passenger loading bridge monitors the operation of a drive system which raises and lowers the bridge. In the event of a malfunction of the drive system, the brake system interrupts power to the drive system and actuates a brake to prevent further operation of the drive system.

3 Claims, 3 Drawing Figures

4,344,200

BRIDGE BRAKE SYSTEM

BACKGROUND OF THE INVENTION

The instant invention relates to a brake system that monitors the operation of a drive system which raises and lowers an aircraft passenger loading bridge. In the event of a malfunction of the drive system, the brake system interrupts power to the drive system and actuates a brake to prevent further operation of the drive system.

An aircraft passenger loading bridge provides an enclosed shelter through which passengers can travel between an airport and an aircraft. Normally, one end of the bridge is attached to the terminal and the other end is movable horizontally and vertically to enable it to be precisely aligned with the doorways of different types of aircraft. Typically, a bridge has one drive system which moves the bridge horizontally and another drive system which elevates and lowers the end of the bridge remote from the terminal. In the event of a failure in the system which moves the bridge vertically, it is possible that the bridge could fall rapidly and cause an injury to persons on the bridge. Therefore, it is necessary to have a brake system which will automatically be applied in the event of a failure of the drive system which moves the bridge vertically.

In one aircraft passenger loading bridge manufactured by the assignee of the instant invention, an electric motor drives a pair of ball screws which raise and lower the movable end of the bridge. The motor is connected to the ball screws by a pair of chains. In the event one ball screw becomes inoperative, such as would happen if a chain broke or the ball screw froze, the motor would continue to operate the other ball screw. If the operator continued to actuate the drive system, the operating ball screw would raise one side of the bridge and cause a torsional strain on the bridge which would severely damage it. Accordingly, it is desirable to have a brake system which interrupts the operation of the bridge drive system in the event one ball screw is driving and the other is stationary.

It is also desirable to have a brake system which operates to stop the operation of the bridge in the event both ball screws are operating but one is operating significantly faster or slower than the other.

The primary failure condition which must be protected against by a bridge brake system is that in which the bridge starts to fall too rapidly. In one prior bridge control system, a brake is automatically applied whenever a switch which actuates the vertical bridge drive system is released. A disadvantage of this system is that, if there is a failure of the vertical drive system when an operator is raising or lowering the bridge, the operator must release the switch before the brake can be applied. However, if the operator panics and does not move his hand off of the switch, the brake will not be applied. Therefore, it is desirable to have a bridge brake system which will automatically stop all operation of the bridge drive system as well as apply a brake to stop further vertical movement of the bridge as soon as the rate of movement of the bridge exceeds a predetermined maximum.

SUMMARY OF THE INVENTION

The instant invention provides a brake system that monitors the speed of each of the ball screws in a drive system which operates to raise and lower the movable end of a passenger loading bridge. If the speed of each of the ball screws is within a preset range, the brake system takes no action. However, if the speed of one of the ball screws is outside of the preset range, a malfunction of the drive system is indicated and the brake system interrupts power to the drive system and actuates a brake to prevent further operation of the drive system.

DESCRIPTION OF THE PREFERRED EMBODIMENT

Figure 1:
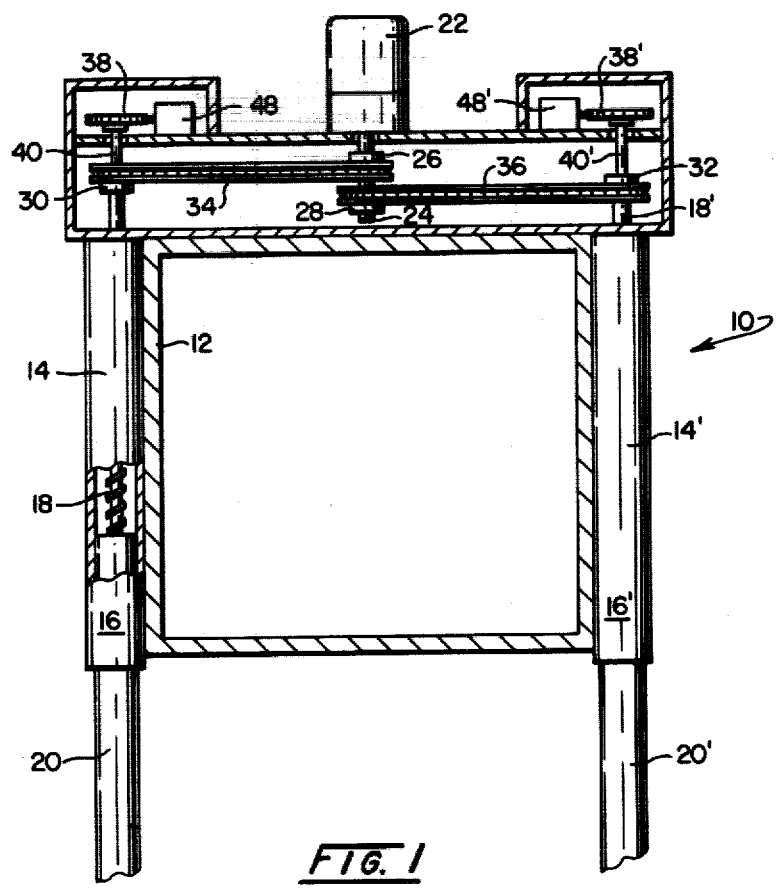
FIG. 1 is a partial sectional view through an aircraft passenger loading bridge tunnel showing the drive system which raises and lowers the movable end of the bridge.

Referring to FIG. 1 of the instant invention, an aircraft passenger loading bridge 10 has the movable outer end of a tunnel 12 rigidly affixed to a pair of outer sliding members 14, 14' which are part of a pair of telescoping supports 16, 16', respectively. A ball screw 18, 18' is mounted in each of the supports 16, 16'. When the ball screws 18, 18' are rotated, the outer members 14, 14' telescope over inner members 20, 20' which are attached to a ground engaging base to thereby raise and lower the movable end of the bridge.

The ball screws 18, 18' are driven by an electric motor 22. Motor 22 has an output shaft 24 upon which are mounted a pair of drive sprockets 26, 28. A sprocket 30, 32 is attached to the top of each ball screw 18, 18', respectively, and the sprockets 30, 32 are in horizontal alignment with the sprockets 26, 28, respectively, on shaft 24. A chain 34 connects sprockets 26 and 30 and a chain 36 connects sprockets 28 and 32. Consequently, when motor 22 is operated and output shaft 24 is rotated in one direction, the drive sprockets 26, 28 rotate the chains 34, 36 in the same direction to thereby drive the sprockets 30, 32 attached to the ball screws 18, 18'. The two drive sprockets 26, 28 have the same number of teeth as do the two driven sprockets 30, 32. Consequently, the motor 22 drives the two ball screws 18, 18' at the same speed, which ensures that each side of the tunnel 12 will be elevated and lowered at the same rate.

An idler sprocket 38, 38' is driven by a shaft 40, 40' attached to the top of each of the ball screws 18, 18', respectively. The purpose of the idler sprockets 38, 38' is to enable a sensing device to monitor the speed of rotation of each of the ball screws 18, 18'.

Figure 2:
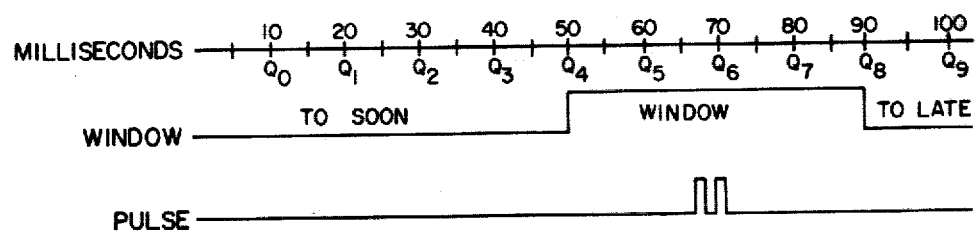
FIG. 2 is a time-line diagram illustrating the operation of the bridge brake system of the instant invention.
Figure 3:
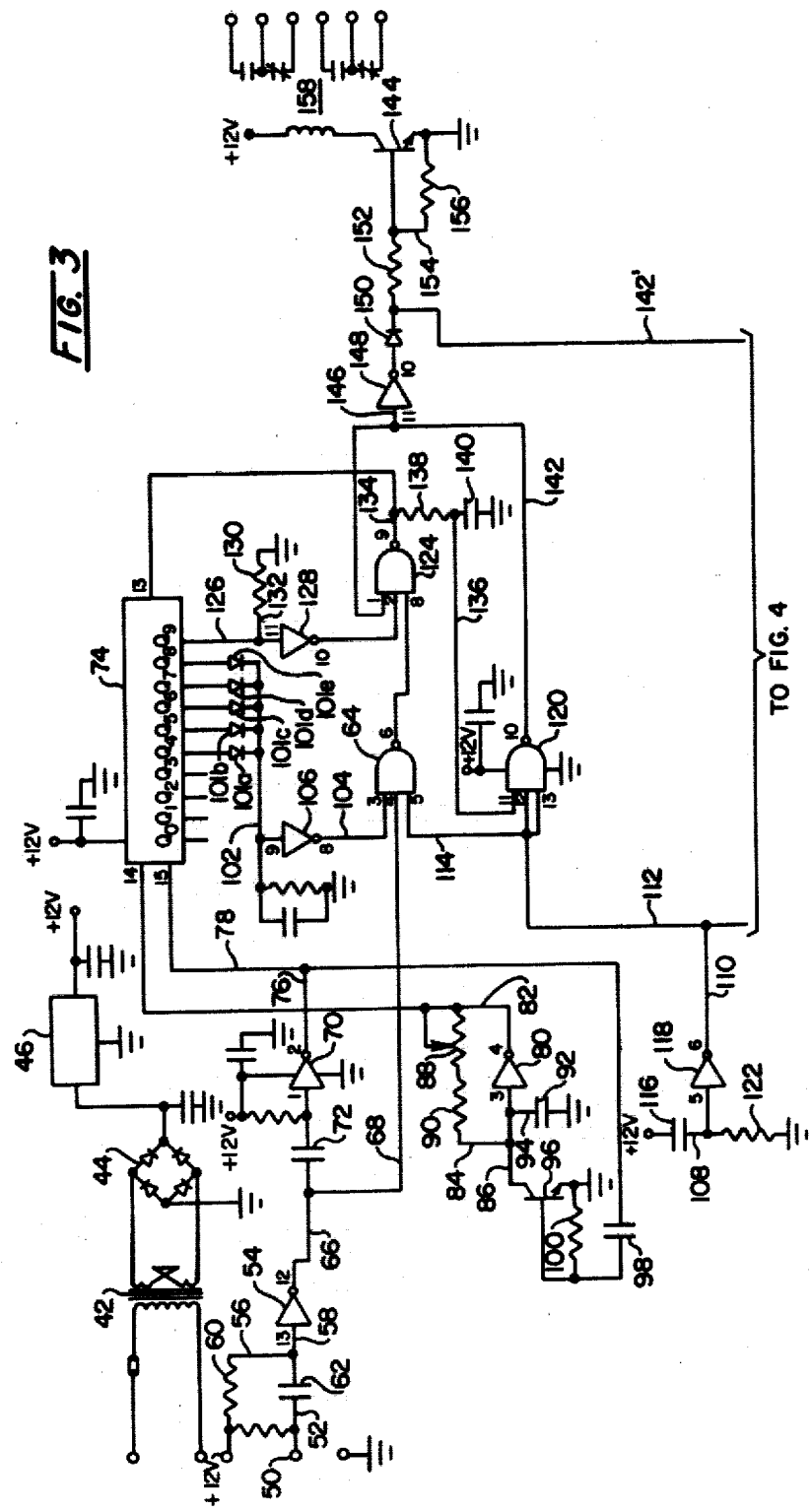
FIG. 3 is a circuit diagram of one-half of the instant bridge brake system.
Figure 4:
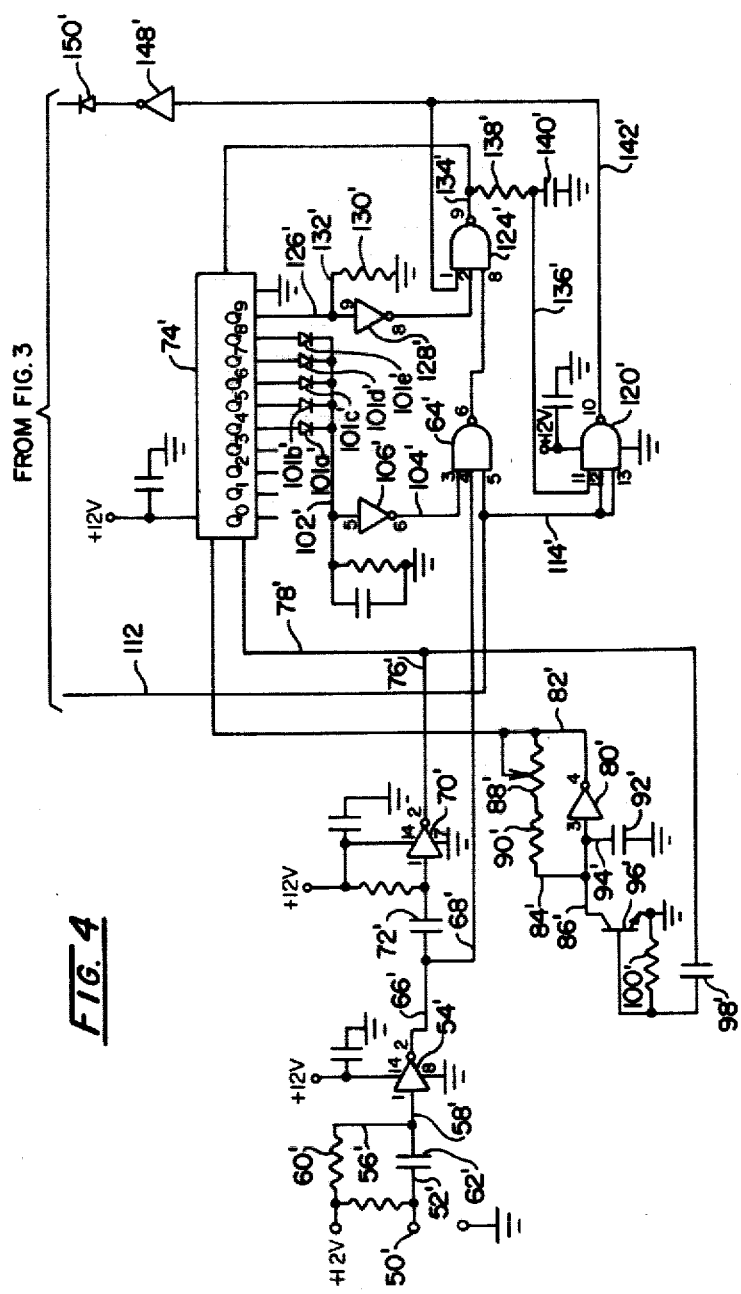
FIG. 4 is a diagram of the other half of the bridge brake system and combines with FIG. 3 to provide a complete circuit diagram of the brake system of the instant invention.

Referring to FIGS. 2–4, the description of the bridge brake system of the instant invention will now be described. The bridge brake system utilizes a pair of sensors which sense the speed of rotation of each of the ball screws 18, 18' and a pair of logic circuits which analyze the signals produced by the sensors. One of the circuits operates a relay which interrupts power to the bridge drive system and actuates a pair of brakes which are applied to the ball screws 18, 18' to prevent further operation of the ball screws 18, 18' when the rotational speed of one of the ball screws 18, 18' is outside of a set range. Since the sensor and circuit used to monitor one ball screw 18, shown in FIG. 3, is virtually identical to that used to monitor the other ball screw 18', shown in FIG. 4, this description will refer to the sensor and circuit which monitor and act on ball screw 18. Identical elements of the sensor and circuit which monitor and operate on the other ball screw 18' will be identified by identical primed numbers.

Referring to FIGS. 1–4, the bridge brake system has a power supply which includes a transformer 42, a diode bridge 44 and a regulator 46. The power supply converts a 120 volt AC input to a 12 volt DC supply to the remainder of the bridge brake system. The system includes an eddy current killed oscillator (ECKO) switch 48 which is mounted on the top of the passenger loading bridge 10 adjacent the idler sprocket 38, as shown in FIG. 1. The ECKO switch 48 senses each time a tooth of the idler sprocket 38 moves past it. When ball screw 18 is operating properly, the idler sprocket teeth pass the ECKO switch 48 at a rate of 14 teeth per second. In other words, every 71 milliseconds a tooth passes switch 48. Each time a tooth passes the ECKO switch it provides a short circuit for current flowing through a coil wrapped around an oscillator and drains sufficient energy to cause the oscillator in the switch to stop. This produces a signal which causes a momentary low at pin 50 of line 52 which is connected to switch 48.

The 12 volt supply is connected to pin 13 of a Schmitt inverter 54 through lines 56, 58 and a resistor 60. The 12 volt supply to pin 13 is holding the input of inverter 54 high. When the ECKO switch 48 provides a momentary low at pin 50 of line 52, a capacitor 62 connected to pin 13 through line 58 discharges, pin 13 drops low momentarily, i.e., for approximately 1.5 milliseconds, and pin 12 of the inverter 54 snaps high. A high at pin 12 is conveyed to pin 4 of a three in NAND gate 64 through lines 66, 68. At this point it should be noted that if all of the inputs to NAND gate 64 are high, the bridge brake system will interpret this as a malfunction and will operate to interrupt power to the bridge drive system and permit a brake to be applied to ball screw 18, as will be described hereinafter.

The momentary transition from low to high and back to low at pin 12 of inverter 54 causes a momentary transition at pin 1 of a Schmitt inverter 70, which is connected to pin 12 of inverter 54 through line 66 and a capacitor 72. Capacitor 72 delays the transition of inverter 70 so that it trails the transition of inverter 54 by a couple of milliseconds. The transition from high to low at pin 1 of inverter 70 causes a transition from low to high at pin 2 of inverter 70. The high at pin 2 provides a pulse to the reset pin 15 of a counter 74 through lines 76, 78. Counter 74 provides a signal to three in NAND gate 64 as described below.

A clock pulse is applied to clock pin 14 of counter 74 to cause the counter to step through, i.e., provide a high sequentially to each of its outputs Q0–Q9. The clock pulse is supplied to pin 14 of counter 74 from pin 4 of a Schmitt inverter 80 through a line 82. Pin 4 of inverter 80 is connected back to its input pin 3 through lines 82, 84, 86 and a variable resistor 88 in series with a resistor 90. A capacitor 92 is connected to pin 3 of Schmitt inverter 80 through lines 94, 86. The built in hysteresis of Schmitt inverter 80 and the R/C network causes a clock pulse to occur at pin 4. When power is initially supplied to the chip which contains inverter 80, pin 3 is low and pin 4 is high. This causes capacitor 92 to charge through resistors 88 and 90. When the voltage at pin 3 reaches two-thirds of the supply voltage to inverter 80, pin 4 snaps from high to low. When pin 4 goes low, capacitor 92 starts to discharge through resistors 90 and 88. When the voltage at pin 3 reaches one-third of the supply voltage, pin 4 again snaps high and provides the next clock pulse to pin 14 of counter 74. Each time a clock pulse is supplied to pin 14, a high occurs on the next consecutive output Q0–Q9 of counter 74. The values of resistors 88, 90 and capacitor 92 are selected so that a pulse occurs at clock pin 14 of counter 74 every ten milliseconds.

As mentioned above, the momentary transition from low to high of pin 2 of Schmitt inverter 70 is applied to reset pin 15 of counter 74 through lines 76, 78. This same momentary transition is conveyed to the base of a transistor 96 through lines 76, 78 and a capacitor 98. A resistor 100 is connected between the emitter and line 78. When the momentary high is applied to line 78, transistor 96 is turned on for a brief period of time, i.e., approximately 1.5 milliseconds, and capacitor 92 is discharged. When capacitor 92 is discharged, pin 3 of inverter 80 goes low, pin 4 goes high and the clock is reset. This occurs each time counter 74 is reset. If the clock were not reset each time counter 74 was reset, the first clock pulse would not be a full ten milliseconds unless it happened to start the same instant the counter 74 was reset.

Outputs Q4–Q8 of counter 74 are connected to pin 3 of NAND gate 64 through diodes 101a–101e, lines 102 and 104 and an inverter 106. Since the outputs Q0–Q9 are actuated sequentially every ten milliseconds, the output of counter 74 as seen at pin 3 of gate 64 corresponds to a time window of between 50 and 90 milliseconds after counter 74 is reset. This causes a low to be supplied to pin 3 during the window, which prevents the output of NAND gate 64 from changing state during that time.

Pin 5 of NAND gate 64 is held high at all times except for the period immediately following the initial application of power to the bridge brake circuit. Referring to FIG. 3, pin 5 of NAND gate 64 is connected to output pin 6 of an inverter 118 through lines 110, 112 and 114. The 12 volt supply is connected to pin 5 of inverter 118 through line 108 and a capacitor 116. A resistor 122 is connected between one side of capacitor 116 and ground. When power is initially supplied to the bridge brake system, capacitor 116 is not charged. Consequently, the supply voltage causes both sides of the capacitor 116 to go high. This makes pin 5 of inverter 118 high and pin 6 of that inverter low. Since pin 6 is connected to pin 5 of NAND gate 64, the gate 64 is prevented from changing state. Output pin 6 of inverter 118 is also connected to pins 12 and 13 of a three in NAND gate 120 through lines 110, 112 and 114. After capacitor 116 is charged, the side of the capacitor connected to the power supply remains high and the side connected to pin 5 of inverter 118 goes low. This makes pin 6 of inverter 118 go high. The high at pin 6 is then seen at pin 5 of NAND gate 64 and pins 12 and 13 of NAND gate 120. Since pin 5 of gate 64 is high, the gate 64 can change state if pins 3 and 4 are made high.

The purpose of holding pin 5 of gate 64 low when the bridge brake system is started is to delay operation of the bridge brake system for a brief period of time when the bridge drive system begins to operate. When the unit is cold the ball screws 18, 18' may turn somewhat slower than normal when first started. If the brake brake system went on line immediately, it would see this as a malfunction and shut the drive system down before it got warmed up. The purpose of resistor 122 is to control the time it takes for the capacitor to charge, which is also the time that the side of the capacitor 116 connected to pin 5 of inverter 118 stays high. The resistor 122 and capacitor 116 are sized so that pin 5 of inverter 118 stays high for approximately 400 milliseconds. This maintains a low at pin 5 of NAND gate 64 and pins 12 and 13 of NAND gate 120 for the same length of time. Subsequent to this time, pin 5 of inverter 118 goes low and pin 6 goes high and a high is maintained at pin 5 of NAND gate 64 and pins 12 and 13 of NAND gate 120 to enable the bridge brake system to operate.

Whenever all of the inputs to NAND gate 64 are high, a relay is energized which interrupts power to the bridge drive system and actuates brakes to lock the ball screws 18, 18', as will now be described. Output pin 6 of NAND gate 64 is connected to input pin 8 of a three in NAND gate 124. Output Q9 of counter 74 is connected to input pin 2 of NAND gate 124 through line 126 and an inverter 128. Consequently, a high is seen at pin 2 at all times, except when output Q9 goes high. A resistor 130 is connected to input pin 11 of inverter 128 through lines 132, 126. The purpose of resistor 130 is to prevent stray signals from causing inverter 128 to change state.

Output pin 9 of NAND gate 124 is connected to input pin 11 of NAND gate 120 through lines 134, 136 and a resistor 138. Resistor 138 is tied to ground through a capacitor 140. Resistor 138 and capacitor 140 prevent stray signals from entering pin 11 of NAND gate 120.

Output pin 10 of NAND gate 120 is tied back to input pin 1 of NAND gate 124 through a line 142. Thus, it can be seen that NAND gates 120, 124 cooperate to form a latch. The output at pin 10 of NAND gate 120 is connected to the base of a transistor 144 through lines 142, 146, an inverter 148, a diode 150 and a resistor 152. The base of transistor 144 is connected to the emitter through a line 154 and a resistor 156. When latch gates 120, 124 change state and power is supplied to the base of transistor 144 to turn the transistor 144 on, power is supplied to a relay 158.

Relay 158 is a latching relay and once it is initiated it latches closed. The relay 158 receives its power from a separate transformer, not shown, which holds the relay in. When relay 158 is latched closed it interrupts power to the drive system for the bridge and also interrupts power to a pair of magnetically applied brakes, not shown, which lock onto ball screws 18, 18' to prevent rotation thereof. The output of NAND gate 124 is also connected to the inhibit gate pin 13 of counter 74.

Operation of the instant bridge brake system will now be described. During normal operation of bridge 10 the ball screws 18, 18' rotate at such a speed that one tooth of the sprockets 38, 38' passes eddy current killed oscillator switches 48, 48' approximately every 71 milliseconds. If, for some reason, the bridge begins to move too rapidly, for example, because one of the drive chains 34, 36 broke, one of the ball screws 18, 18' and its idler sprocket 38, 38', respectively, rotates faster than normal and an ECKO switch 48, 48' produces a signal more often than every 71 milliseconds. If one of the ball screws 18, 18' rotates too slowly, such as if it is bound up, a sprocket 38, 38' rotates slower than normal and an ECKO switch 48, 48' produces a signal less often than every 71 milliseconds.

Consequently, it can be seen that the rate of ascent and descent of the bridge is monitored by ECKO switches 48, 48' which sense the speed of rotation of the ball screws 18, 18'. Through testing it has been determined that if the ball screws 18, 18' and sprockets 38, 38', respectively, rotate at such a speed that the ECKO switches 48, 48' produce a signal which results in a change of state of the Schmitt inverters 54, 54' within a window of every 50-90 milliseconds, the bridge is operating correctly. If a pulse is produced by an ECKO switch 48, 48' outside of the 50-90 millisecond window, the bridge brake system interprets this as a malfunction of the bridge and turns on transistor 144. When transistor 144 is on, relay 158 is operated to interrupt power to the bridge drive system and actuate brakes which lock the ball screws 18, 18'.

The operation of the bridge brake system when a pulse is received before the start of the 50-90 millisecond window which indicates one of the ball screws 18, 18' is rotating too rapidly will now be described. This description will refer only to the portion of the system which monitors and acts on the operation of ball screw 18, since an identical portion of the system monitors and acts on the operation of ball screw 18' as mentioned above. After counter 74 is reset, a clock signal is supplied to the counter 74 which steps the counter through each of its ten outputs sequentially every ten milliseconds. A pulse that occurs before the window occurs between zero and 50 milliseconds. Such a pulse from ECKO switch 48 causes Schmitt inverter 54 to change state, which produces a high at pin 4 of NAND gate 64. As previously mentioned, pin 5 of NAND gate 64 and pins 12 and 13 of NAND gate 120 go high and are held high 400 milliseconds after the bridge brake system is started. Within the time period of zero to 50 milliseconds, the outputs Q4-Q8 of counter 74 which are connected to pin 3 of NAND gate 64 through inverter 106 are low and cause a high at pin 3. Since all inputs to NAND gate 64 are high, the gate changes state and a low is produced at output pin 6. The low at pin 6 causes NAND gate 124 to change state which, in turn, causes NAND gate 120 to change state. When gate 120 changes state, the output at pin 10 is low. The low is changed to a high by inverter 148 and current is supplied to turn on transistor 144. When transistor 144 is on it actuates relay 158 to interrupt power to operate the bridge drive system and permits magnetically applied brakes to lock ball screws 18, 18'. Although power to the bridge drive system is interrupted and motor 22 is stopped, a separate source of power maintains lighting within the bridge.

The operation of the bridge brake system when a pulse is received after the 50-90 millisecond window is as follows. In the event a pulse is not received within 90 milliseconds, counter 74 produces an output at terminal Q9. The high at Q9 causes pin 2 of NAND gate 124 to go low. This causes gate 124 to change state which, in turn, causes the other gate 120 of the latch to change state. When this happens pin 10 of NAND gate 120 goes low, a high is produced at the output of inverter 148 and current is supplied to turn on transistor 144, as described above.

Operation of the bridge brake system during normal operation of the bridge drive system is as follows. In this instance, the eddy current killed oscillator switch 48 produces a signal within the 50-90 millisecond window as seen in FIG. 2. This signal causes the output of inverter 54 to go high. This high is seen at pin 4 of NAND gate 64. During the 50-90 millisecond window, a high is produced at one of the outputs Q4-Q8 of counter 74. The signal from the outputs Q4-Q8 is inverted by inverter 106 to thereby hold pin 3 of NAND gate 64 low during the 50-90 millisecond window. Since pin 3 of NAND gate 64 is low when the high is received at pin 4, the NAND gate does not change state, the latch gates 124, 120 do not change state and operation of the bridge is not interrupted.

Referring to FIG. 2, it can be seen that two pulses are shown on the pulse line within the window. The first pulse is the pulse to NAND gate 64. The second pulse is that which is delayed by inverter 70 and is subsequently applied to the reset pin 15 of counter 74. This same pulse also resets the clock so that the clock starts to count a new ten millisecond pulse the instant the counter 74 is reset.

As mentioned previously, output pin 9 of NAND gate 124 is connected to pin 13 of counter 74 through line 134. Pin 13 is connected to the inhibit gate of counter 74. A high at the inhibit gate prevents counter 74 from operating by inhibiting the clock. In other words, even though further pulses are received at clock pin 14 of counter 74, the counter 74 no longer operates to cause successive pulses to produce a high at the outputs Q0-Q9. Consequently, the output of counter 74 remains low and transistor 144 remains energized until NAND gate 124 again changes state.

In a test model of a circuit constructed in accordance with the present invention, the following significant component values and standard integrated circuit designations were used for the identified components. All resistors are one-quarter watt carbon having a plus or minus 5% tolerance except as noted. Clockwise rotation of potentiometers increases voltages.

| Transistors, Diodes and Integrated Circuits | | |
|---|---|---|
| Number | Designation | |
| 54, 54', 70, 70', 106, 106', 128, 128', 80, 80', 148, 148', 118, 118' | 40106 | Hex Schmitt Inverter |
| 144 | Motorola | MJE803 |
| 64, 64', 124, 124', 120, 120' | 4023 | Triple 3-input NAND |
| 74, 74' | 4017 | Counter |
| 150, 150', 101a-101e | IN914 | Diode |
| 44 | IN4007 | |
| 96 | 2N2222 | Transistor |

| Number | Component | Value |
|---|---|---|
| 62, 62', 72, 72' 98, 98' | Capacitor | .001 microfarad |
| 92, 92', 140, 140' | Capacitor | .01 microfarad |
| 116 | Capacitor | .1 microfarad |
| 60, 60', 90, 90', 100, 100', 130, 130', 156, 156' | Resistor | 100K |

| -continued | | |
|---|---|---|
| Transistors, Diodes and Integrated Circuits | | |
| 152 | Resistor | 10K |
| 138, 138' | Resistor | 10K |
| 88, 88' | Potentiometer | 1K |

From the above it can be seen that the instant invention provides a highly responsive yet relatively simple brake system which monitors the operation of the bridge drive system by observing the speed of rotation of the ball screws which raise and lower the movable end of the bridge. In the event the rotational speed of the ball screws is outside of set limits, a malfunction is indicated and the brake system interrupts power to the bridge drive system and actuates brakes to lock the ball screws 18, 18'.

Although a preferred embodiment of the instant invention has been illustrated and described, it will be apparent to those skilled in the art that various modifications may be made without departing from the spirit and scope of the present invention.

What is claimed is:

1. A passenger loading bridge having a movable end comprising: means connected to the bridge for driving the movable end; brake means mounted adjacent the driving means for engaging and locking the driving means when actuated, means mounted on the bridge for sensing the rate of movement of the driving means; first means mounted adjacent the driving means for producing a signal at a rate proportional to the rate of movement of the driving means characterized by: second means mounted on the bridge for producing a signal during a preset time window; comparator means operatively connected to the first and second signal producing means for determining whether the signal from the first signal producing means occurs during the time a signal is produced by the second signal producing means and means operatively connected to the drive means for interrupting said driving means and actuating the brake means to engage and lock the driving means when the signal from the first signal producing means occurs outside of the time the signal is produced by the second signal producing means.

2. The passenger loading bridge of claim 1 wherein the second signal producing means further includes a counter, a timing device which provides a clock pulse at a set time interval to the counter which pulses sequentially actuate the outputs of the counter and a portion of the counter outputs set the time window.

3. The passenger loading bridge of claim 2 further characterized by a third means operatively connected to the second signal producing means for producing a signal which resets the counter each time a signal is produced by the first signal producing means and the third signal producing means initializes the timing device at the same time it resets the counter to ensure that the beginning of a clock pulse coincides with the beginning of the timing period of the counter.

* * * * *